US008745510B2

United States Patent
D'Alo' et al.

(10) Patent No.: US 8,745,510 B2
(45) Date of Patent: Jun. 3, 2014

(54) COMPLEX OPERATION EXECUTION TOOL

(75) Inventors: Salvatore D'Alo', Rome (IT);
Arcangelo Di Balsamo, Aprilia (IT);
Rosario Gangemi, Rome (IT);
Giovanni Lanfranchi, Piacenza (IT);
Scot Maclellan, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1067 days.

(21) Appl. No.: 12/334,088

(22) Filed: Dec. 12, 2008

(65) Prior Publication Data

US 2009/0158187 A1 Jun. 18, 2009

(30) Foreign Application Priority Data

Dec. 13, 2007 (EP) .................... 07123134

(51) Int. Cl.
*G06F 3/048* (2013.01)

(52) U.S. Cl.
USPC ........... 715/763; 715/766; 715/769; 715/772; 715/968; 715/970

(58) Field of Classification Search
USPC ................. 715/763, 766, 769, 772, 968, 970
See application file for complete search history.

(56) References Cited

U.S. PATENT DOCUMENTS

| 6,160,549 | A  | 12/2000 | Touma et al. |
|---|---|---|---|
| 7,249,131 | B2 | 7/2007 | Skufca et al. |
| 2002/0054149 | A1 | 5/2002 | Genise et al. |
| 2003/0195757 | A1 | 10/2003 | Greenstein |
| 2004/0068489 | A1 | 4/2004 | Dettinger et al. |
| 2004/0210909 | A1 | 10/2004 | Dominguez et al. |
| 2004/0254928 | A1 | 12/2004 | Vronay et al. |
| 2005/0039033 | A1 | 2/2005 | Meyers et al. |
| 2006/0031443 | A1 | 2/2006 | Carpenter et al. |
| 2006/0242101 | A1 | 10/2006 | Akkiraju et al. |
| 2007/0266019 | A1 | 11/2007 | Lavi |

FOREIGN PATENT DOCUMENTS

| GB | WO2004070629 A2 | 8/2004 |
|---|---|---|
| KR | 20030067794 A1 | 8/2003 |

OTHER PUBLICATIONS

USPTO, Final Office Action, U.S. Appl. No. 12/472,926, Notification Date Feb. 8, 2012.

*Primary Examiner* — Namitha Pillai
(74) *Attorney, Agent, or Firm* — Nelson and Nelson; Daniel P. Nelson; Alexis V. Nelson

(57) ABSTRACT

A method is presented for executing complex operations. The method may include providing basic packages that include execution instructions for at least partially executing a complex operation. Each basic package may also include combination instructions for combining the execution instructions with execution instructions of another basic package. Several basic packages may be selected. The complex operation may then be executed according to the execution instructions and the combination instructions associated with the selected basic packages.

13 Claims, 7 Drawing Sheets

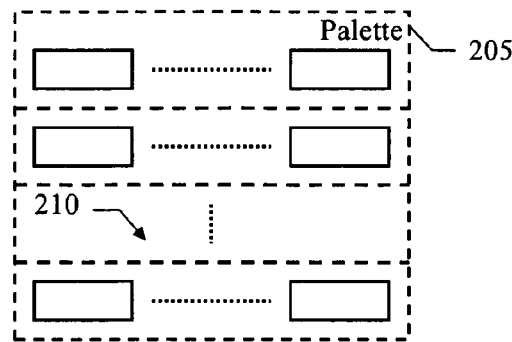
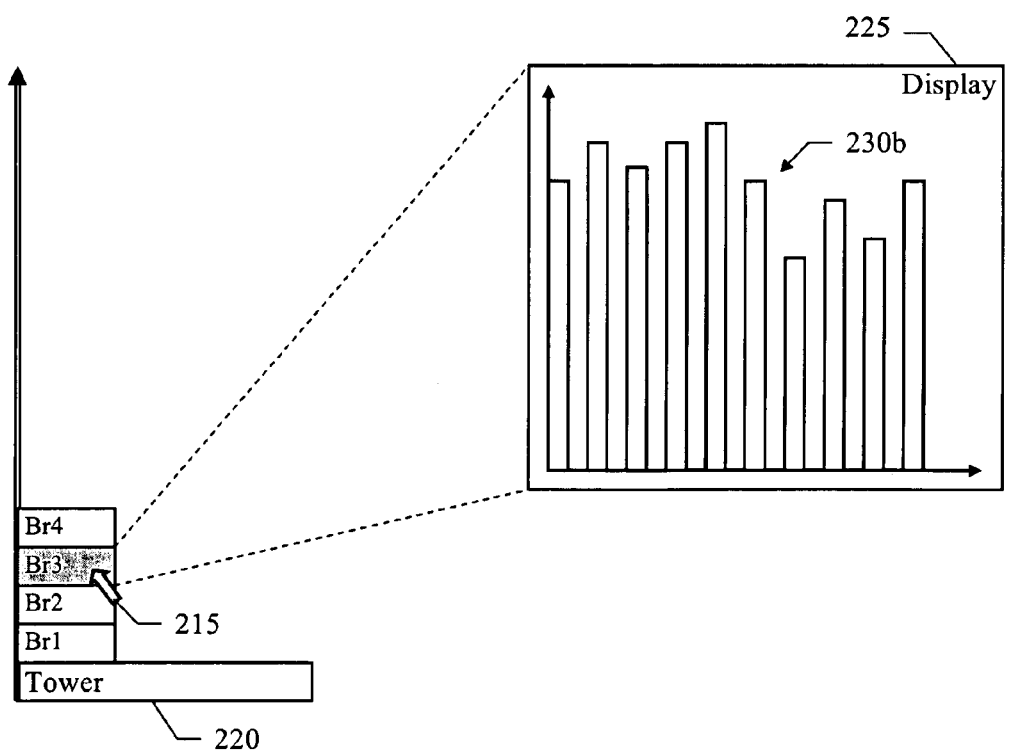
FIG.2B

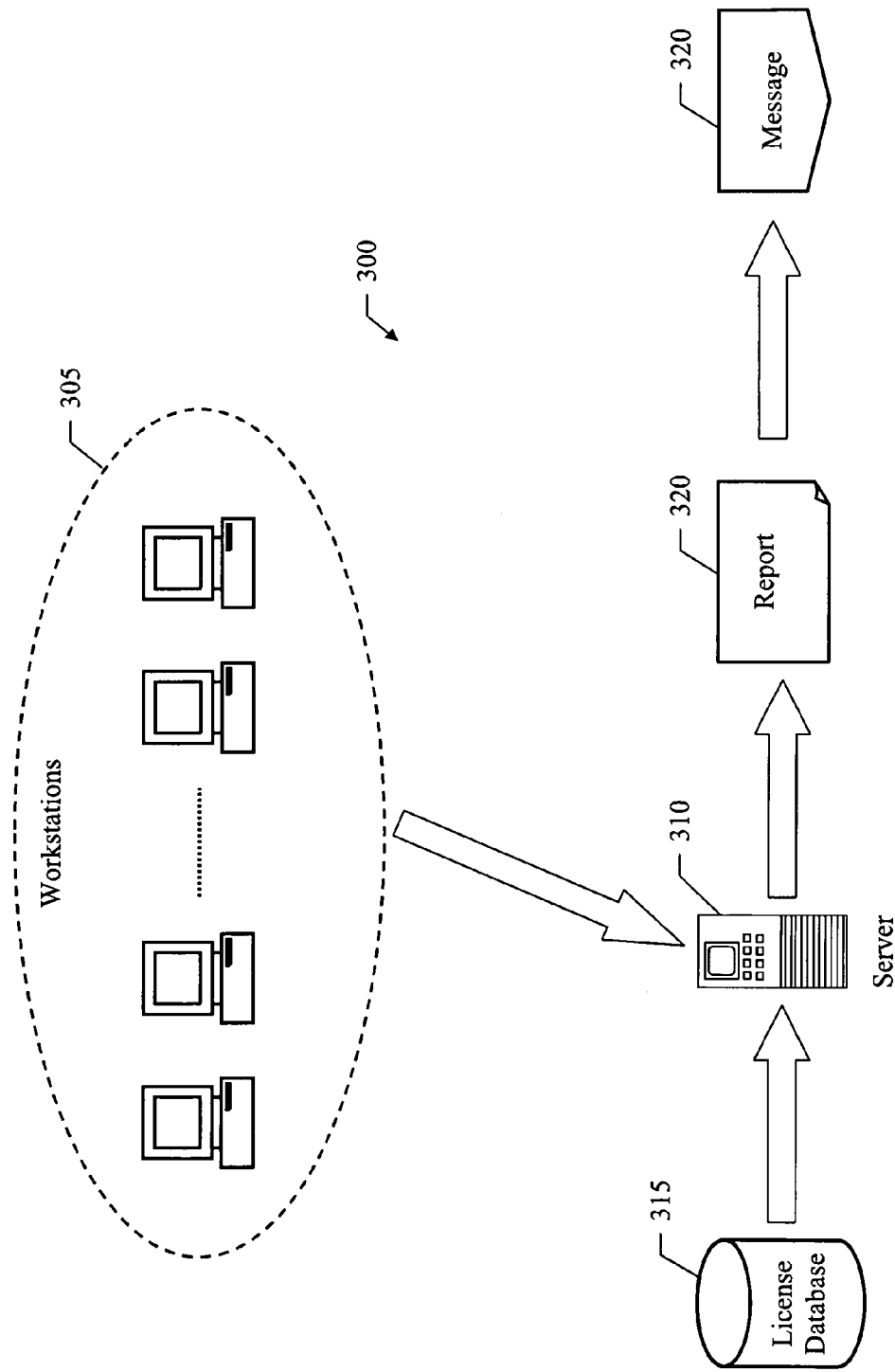

COMPLEX OPERATION EXECUTION TOOL

BACKGROUND

Data processing systems are commonly used to execute a number of complex operations, such as retrieving information, verifying compliance with software licenses, installing software products, and the like.

Particularly, retrieving information in a data processing system typically requires accessing a database consisting of a structured collection of information based on a specific schema. The information stored in the database may be retrieved by submitting queries written in a particular language, such as the Structured Query Language ("SQL"). The database may be controlled by a Database Management System ("DBMS") that may execute queries to extract the corresponding information from the database. This information may be displayed in the form of reports.

Access to available information is often a key factor for success in modern organizations. For example, executives and financial staff may routinely need to retrieve business-related information such as performance indicators, compliance with regulations, and the like. Retrieving information for such purposes may require that business people interact with technology to build and execute SQL queries, for example. Business people, however, may not have the necessary technical expertise to interact effectively with the technology to generate the desired queries. Therefore, the queries may need to be created in advance by technical people with the required skills. These static queries may then be saved for later use by such business people.

SUMMARY

Embodiments of the invention have been developed to provide tools for executing complex operations.

In one embodiment of the invention, a method for executing complex operations may include providing basic packages that include execution instructions for at least partially executing a complex operation. Each basic package may also include combination instructions for combining the execution instructions with execution instructions of another basic package. Several basic packages may be selected. The complex operation may then be executed according to the execution instructions and the combination instructions associated with the selected basic packages.

A corresponding computer program product and system are also disclosed and claimed herein.

BRIEF DESCRIPTION OF THE DRAWINGS

In order that the advantages of the disclosure will be readily understood, a more particular description of embodiments of the invention briefly described above will be rendered by reference to specific embodiments illustrated in the appended drawings. Understanding that these drawings depict only typical embodiments of the invention and are not therefore to be considered limiting of its scope, embodiments of the invention will be described and explained with additional specificity and detail through use of the accompanying drawings, in which:

FIGS. 2A-2C illustrate varying examples of embodiments of the invention;

FIG. 3 illustrates an alternative embodiment of the invention; and

DETAILED DESCRIPTION OF THE INVENTION

Figure 1:
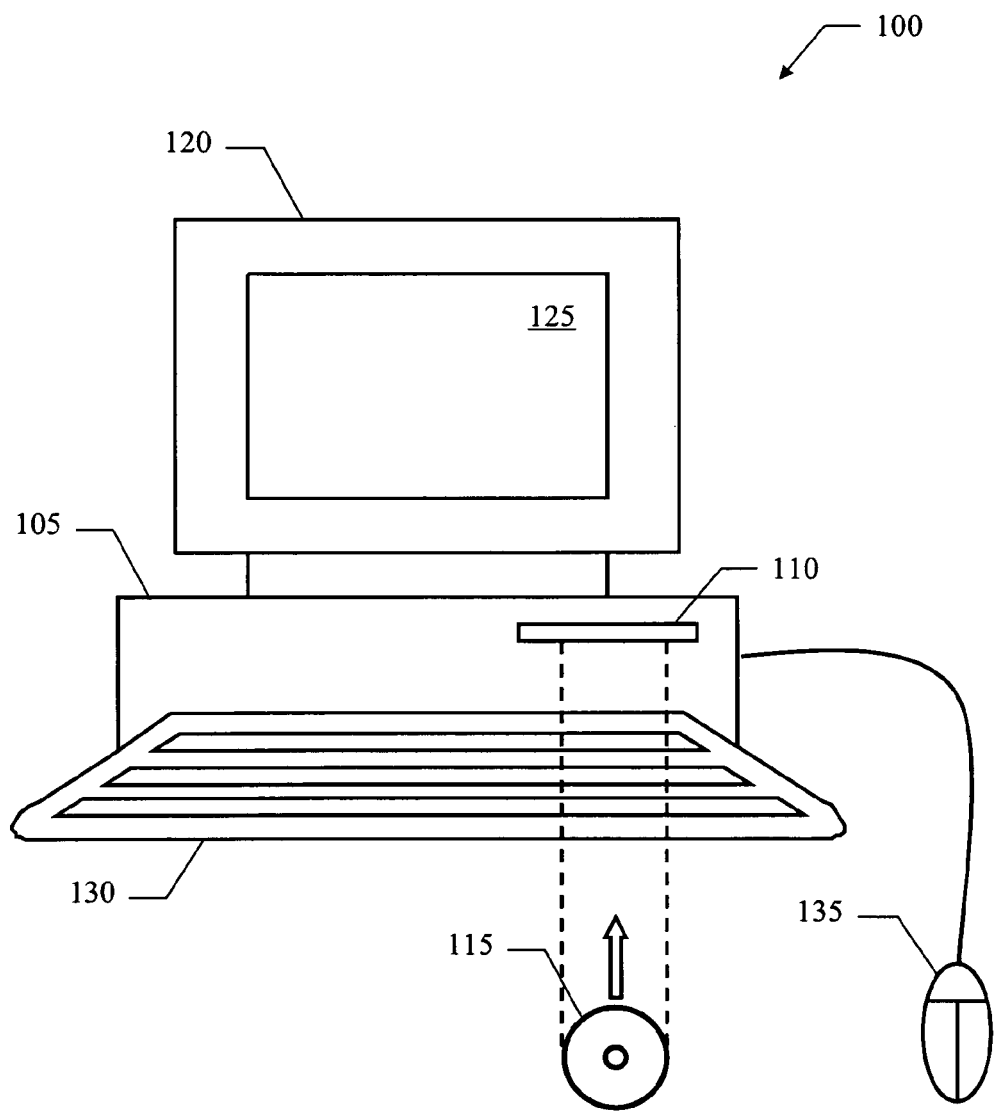
FIG. 1 depicts a data processing system in accordance with certain embodiments of the invention.

It will be readily understood that the components of the embodiments of the invention, as generally described and illustrated in the Figures herein, could be arranged and designed in a wide variety of different configurations. Thus, the following more detailed description of the embodiments of the invention, as represented in the Figures, is not intended to limit the scope of the claims, but is merely representative of certain examples of presently contemplated embodiments in accordance with the invention. The presently described embodiments will be best understood by reference to the drawings, wherein like parts are designated by like numerals throughout.

As will be appreciated by one skilled in the art, embodiments of the invention may be embodied as an apparatus, method, or computer program product. Furthermore, the present invention may take the form of an entirely hardware embodiment, an entirely software embodiment (including firmware, resident software, micro-code, etc.) or an embodiment combining software and hardware elements. Hardware and/or software elements provided to perform various tasks may be generally referred to herein as "modules." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CDROM"), an optical storage device, transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to FIG. 1, a computer 100 (for example, a PC) is illustrated. The computer 100 may be formed by a central unit 105, which may house the electronic circuits controlling its operation. Typically, these electronic circuits may include a microprocessor, a working memory, drives for input/output units, a wireless network adapter (for example, of the Wi-Fi type), and the like. The computer 100 may also be provided with a hard-disk and a drive 110 for reading CD-ROMs and/or DVD-ROMs 115. A monitor 120 may be used to display images on a screen 125. Operation of the computer 100 may be controlled by means of a keyboard 130 and a mouse 135, which may be connected to the central unit 105 in a conventional manner.

The computer 100 may store information in a database, which may be controlled by a corresponding DBMS. For example, a relational database may store the information in tables, each one including many records or rows, all of them having a format defined by a set of corresponding fields or columns. The information may be retrieved from the database by submitting queries, written in a corresponding language, to the DBMS.

Each query may select specific fields of the tables and define searching criteria for the required information. The DBMS may execute each submitted query to extract the selected fields of records that match the searching criteria. The DBMS may also produce reports to display the results of corresponding queries in predefined formats. Alternatively, the computer 100 may operate as a licensing server to verify the compliance of software products installed on multiple workstations of an organization with granted software licenses. In other embodiments, the computer 100 may operate as a software distribution server used to install a specific software product on target workstations, or more generally to execute any other complex operation.

In one embodiment of the invention, a plurality of basic packages may be provided for this purpose. Each basic package may include execution instructions, which may partially contribute to executing the complex operation. Such a package may include, for example, the most common searching criteria or simple operations thereof. The basic package may also include combination instructions, which indicate how the execution instructions of the basic package may be combined with the execution instructions of one or more other basic packages to execute desired complex operations.

A user of the computer 100 may select the basic packages defining a selected complex operation (for example, by acting on corresponding graphical objects). The execution instructions of the selected basic packages may then be combined according to the corresponding combination instructions to execute the selected complex operation. This may involve, for example, creation of a query based on the searching criteria of the selected basic packages and submission of the query to the DBMS. Alternatively, the simple operations of the selected basic packages may be successively invoked.

The proposed embodiments are of general applicability such that information about how to combine the execution instructions of the selected basic packages may be included in the basic packages themselves. Moreover, technology detail relating to the desired complex operation (such as the query language of the DBMS, the schema of the database, or the specific simple operations to be invoked) may be completely transparent to the user.

The proposed embodiments may thus facilitate execution of complex operations, even by business people without specific technical expertise. This may allow varying the nature of the complex operations to be executed on-the-fly to enable one to meet the flexible and dynamic demands typical of modern business environments.

Figure 2A:
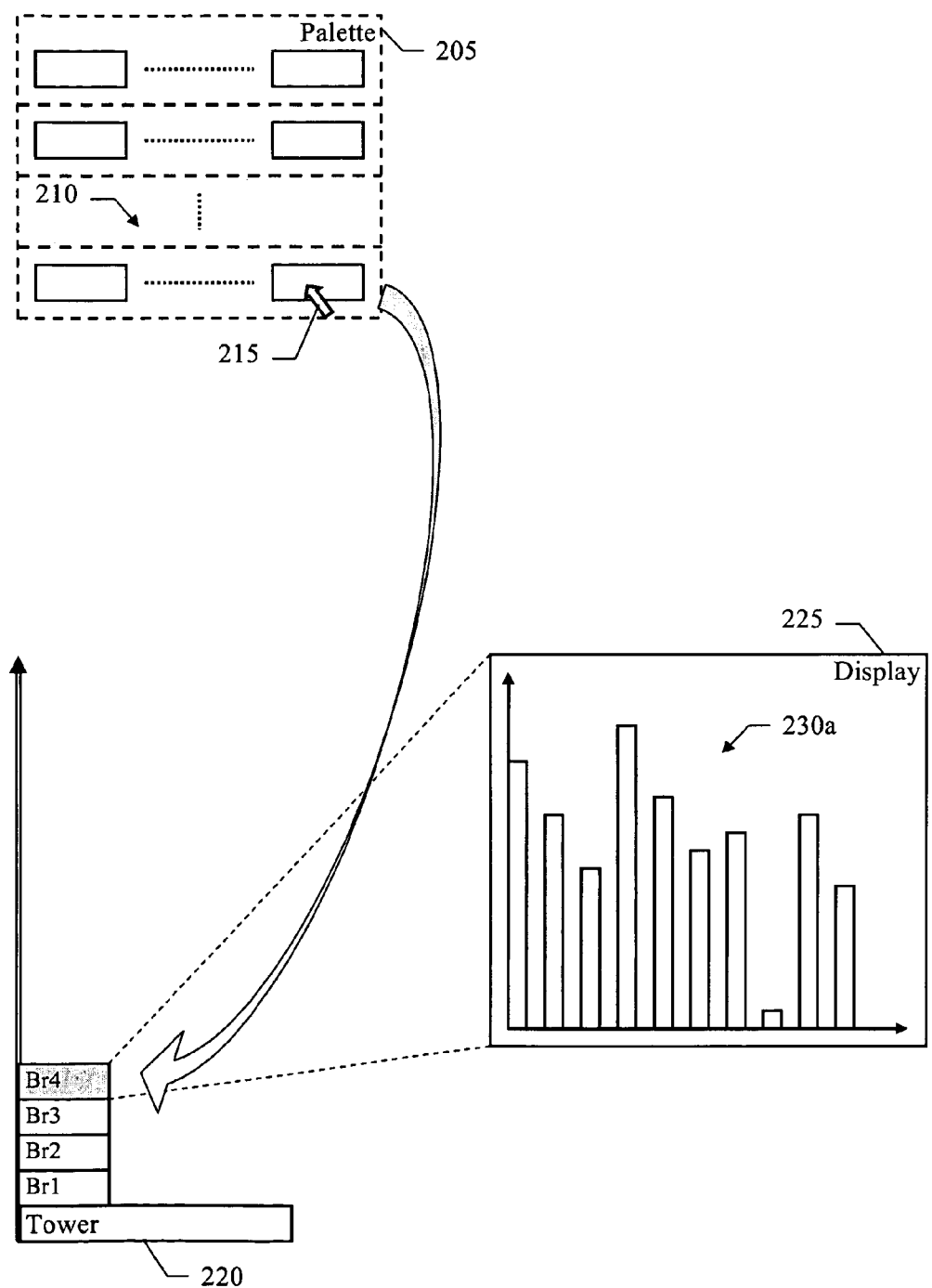

Considering now FIG. 2A, the computer 100 may be provided with a graphical user interface ("GUI") that configures the screen of the monitor like a desktop. Particularly, a frame may define a palette 205 for selecting the basic packages. In one embodiment, the palette 205 may display a graphical representation of each basic package, for example, in the form of a brick 210. Each brick 210 may include a label of the corresponding basic package. Typically, a more detailed description of the basic package may be displayed (such as in a pop-up window) when the user moves a pointer 215, indicating a current position on the desktop, over the brick 210.

In certain embodiments, the bricks 210 may be organized in sets (as indicated by horizontal dashed lines in the figure) for corresponding logic categories. For example, different categories may be defined for specific types of complex operations (such as relating to computers, persons, and the like). This may facilitate identification of bricks 210 for the desired basic packages, especially when their quantity is very high.

The user may select a brick 210 by moving it to a dedicated area of the desktop in the form of a tower 220 (as show by an arrow in the figure). Typically, this may be achieved by a drag-and-drop procedure where the user may move the pointer 215 over the brick 210 to be selected, click on the brick 210 by pressing a button of the mouse, move the pointer 215 to the tower 220 while keeping the button pressed, and releasing the button.

The selected bricks 210 may be stacked one above the other in the tower 220 along a selection sequence indicated by an arrow in the figure, for example. Generally, any new brick 210 may be added on top of the tower 220, and may be highlighted to indicate the last selection (unless the user drops it between two bricks 210 already selected). In the example shown in the figure, the tower 220 may include four selected bricks 210, denoted with Br1, Br2, Br3 and Br4.

The desktop may include another frame that defines a display 225 for outputting the result of the complex operation corresponding to the selected bricks Br1-Br4. Considering in particular a complex operation consisting of a database query, the query may be generated by combining the execution instructions of the basic packages represented by the selected bricks Br1-Br4 according to their combination instructions. The query may then be submitted to the DBMS to retrieve the corresponding information from the database. In the present example, the result of the query may be shown in the display 225 in the form of a histogram 230a.

More specifically, execution instructions of each selected brick Br2-Br4 other than the first one may be combined with the execution instructions of the preceding selected bricks Br1-Br3 in logic AND. In this way, execution instructions of the first brick Br1 may be applied to a universal set defined by the whole database. Execution instructions of the next brick Br2 may be applied to a subset resulting from application of the execution instructions of the preceding brick Br1, and so on until the last brick Br4. It should be noted, however, that each set of execution instructions may only define a pre-canned fragment of the query and may not be a stand-alone executable query in itself. As a result, execution instructions of the selected bricks may be combined in any way to generate the desired query.

Particularly, execution instructions of each basic package may include an indication of the fields to be selected (for a "SELECT" clause of the query), and/or an indication of searching criteria to be applied to specific fields (for a "WHERE" clause of the query). On the other hand, the combination instructions may specify how these indications are to be inserted into the query. For example, it may be possible to specify that a "SELECT" clause must be created when it does not exist, and that the corresponding fields must be added thereto in any case. Likewise, it may be possible to specify that a "WHERE" clause must be created when it does not exist, and that the corresponding searching criteria must be added thereto in any case.

For example, let us consider a database that stores information about a company, including its computers, persons, marketing data, and the like. The computers may be associated with their locations, departments, owners, installed hardware devices and software products, granted licenses, and so on. One brick may be defined for selecting the above-mentioned information relating to the computers. Other bricks may be defined for filtering the results according to their location, department, installed software products, and non-granted licenses, respectively. In this way, if the user is interested in knowing which computers in a specific department of a specific location have installed a specific software product without a corresponding granted license, the user may obtain the required information by simply selecting the brick for the computers, and then the brick for the location, the brick for the department, the brick for the installed software product, and the brick for the non-granted licenses.

In this way, selection of the basic packages and display of the corresponding information may be achieved in a very simple and intuitive manner.

Moving now to FIG. 2B, the user may decide to highlight another selected brick Br1-Br4, such as brick Br3, by clicking over it with the mouse, for example. In response, a new query may be generated by combining the execution instructions of the selected bricks up to the highlighted brick, along the selection sequence (i.e., the selected bricks Br1-Br3 in the example at issue). The new query may be submitted to the DBMS as above, and the corresponding result may be shown in the display 225 by means of another histogram 230b.

With reference to the foregoing examples, wherein the bricks for the computers, the location, the department, the installed software product, and the non-granted licenses have been selected in this order, the user may in turn highlight the brick for the location to see all computers that are available in a particular location, the brick for the department to see the corresponding subset of computers, and the brick for the installed software product to see the computers in the department of the location that have the installed software product (irrespectively of the granted licenses).

In this way, partial results of the query may be displayed in a very simple manner. This further facilitates defining the query through step-by-step refinement.

Figure 2C:
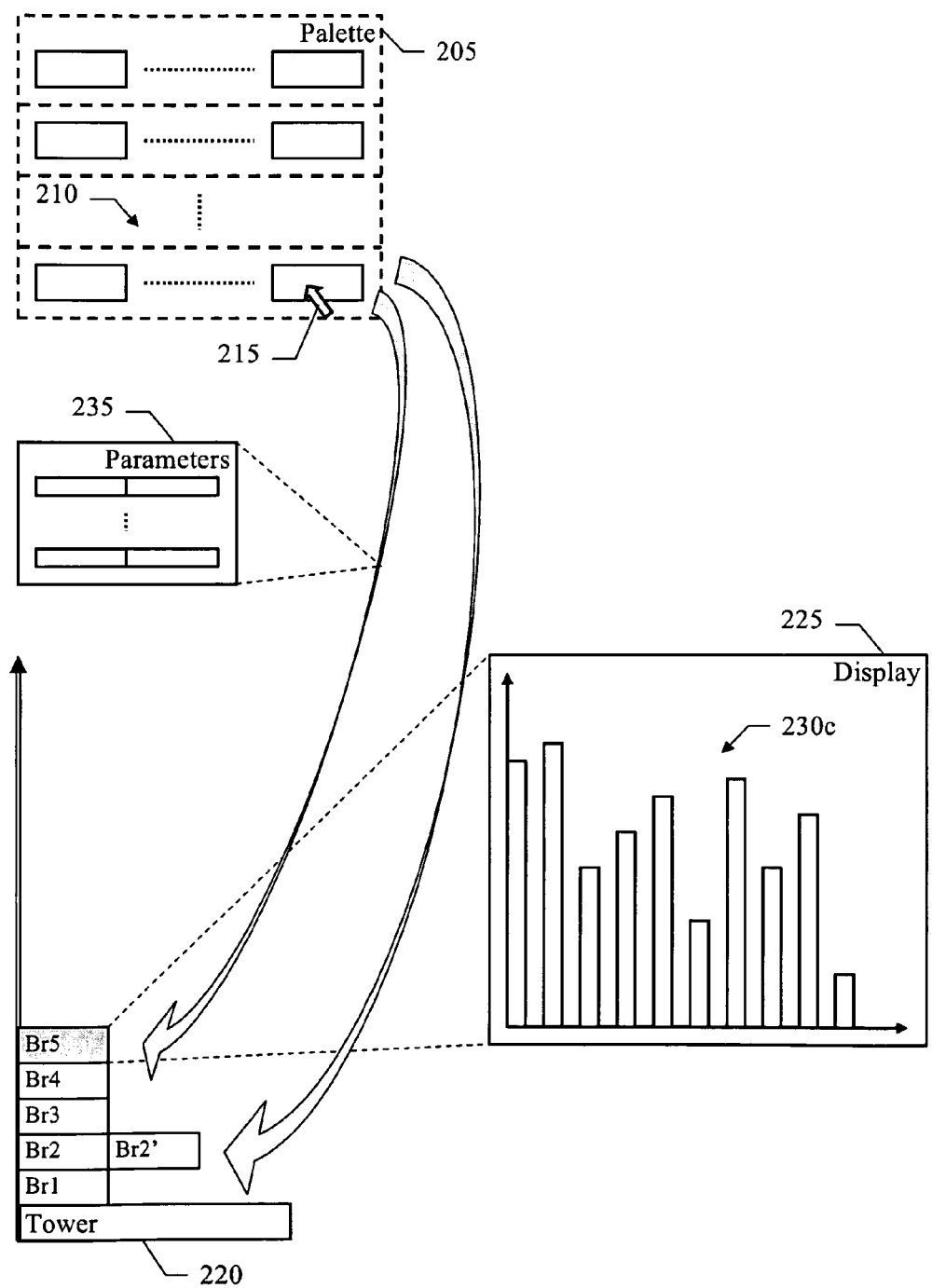

With reference now to FIG. 2C, the user may select a new brick Br5 by dragging and dropping it on top of the tower 220 (causing the new brick Br5 to be automatically highlighted). However, in this case the execution instructions of the new brick Br5 may include one or more parameters to be assigned at run-time. Therefore, when the new brick Br5 is selected, a pop-up window 235 may be opened for assigning dynamic values to the parameters. For each parameter, the pop-up window 235 may include a description of the parameter and an input box for entering its actual value (for example, in the form of a drop-down menu with choices available according to the current content of the database).

In the above-mentioned example, a single brick for the locations, a single brick for the departments, and a single brick for the installed software products may be defined. Each of these bricks may include a parameter for selecting a specific location, department, and installed software product, respectively. In this manner, the number of bricks 210 may be drastically reduced without adversely affecting the flexibility of the proposed solution.

In addition, the user may select a further new brick Br2'. The new brick Br2' may be dragged and dropped at the same position of one or more bricks already selected (the brick Br2 in the example at issue). In this case, the execution instructions of the new brick Br2' (which is not highlighted) may be combined with the execution instructions of the other selected bricks of the same position (Br2) in logic OR. This may result in a single set of execution instructions for the position, which may be combined as indicated above in logic AND with the execution instructions of the preceding bricks (Br1).

If the user is interested in knowing which computers in two departments of a specific location have installed a specific software product without a corresponding granted license, for example, he/she may obtain the required information by selecting the brick for the computers, and then the brick for the locations (specifying the desired one at run-time), two bricks for the departments at the same position (specifying the desired ones at run-time), the brick for the installed software products (specifying the desired one at run-time), and the brick for the non-granted licenses.

This additional feature may facilitate generating complex queries with any logic combination of the searching criteria.

In both of the foregoing cases (i.e., the selection of the new brick Br5 and the selection of the new brick Br2'), corresponding queries may be generated and submitted to the DBMS as above, and their results may be shown in the display 225 by means of other histograms 230c.

More generally, the above-described embodiments may be applied to execution of any complex operation, with the basic packages defining generic simple operations that manipulate information in corresponding domains to provide information in corresponding co-domains.

An example of application of this technique is illustrated in FIG. 3. This figure shows a license management system 300 such as the IBM Tivoli License Compliance Manager ("ITLCM") by IBM Corporation. This system 300 may be used to meter the usage of software products on multiple workstations 305. The process may be controlled by a licensing server 310, which may store a database 315 with information about granted licenses that authorize the different software products to run on the workstations 305.

In this context, a basic package may be defined for collecting inventory information about the software products (possibly selected at run-time by means of one or more corresponding parameters) that are installed on the workstations 305. Another basic package may compare the inventory information with the granted licenses.

If the user is interested in knowing whether the software products installed on the workstations 305 are compliant with the granted licenses, he/she may obtain the required information by simply selecting the basic package for the inventory information and the basic package for its comparison with the licenses, in this order (by dragging the corresponding bricks to the tower one above the other). As a result, the simple operations of the basic package for the inventory information may be executed. This may involve invoking an inventory module on each workstation 305 to collect information about the software products installed thereon. The information may then be transmitted to the licensing server 310. The licensing server 310 may then aggregate the information received from all the workstations 305 into a desired overall inventory information.

Particularly, the inventory information may list the detected software products with the number of workstations 305 on which they are installed. The inventory information may be consumed by the simple operations of the basic package for comparison with the licenses. In some embodiments, the inventory information may be pre-fetched to reduce a latency of the process.

Each software product may be verified as to whether its number of installations is within the maximum value allowed by a corresponding license, as defined in the database 315. This process may generate a report 320, which may list the software products that are not compliant with the corresponding licenses, together with an indication of the workstations 305 where they are installed.

The process may continue with the selection of a further basic package that causes the execution of other simple operations, based on the preceding selected basic packages. For example, in one embodiment, a basic package that specifies a simple operation for sending a warning message 325 to each workstation 305 may be listed in the report 320.

Figure 4A:
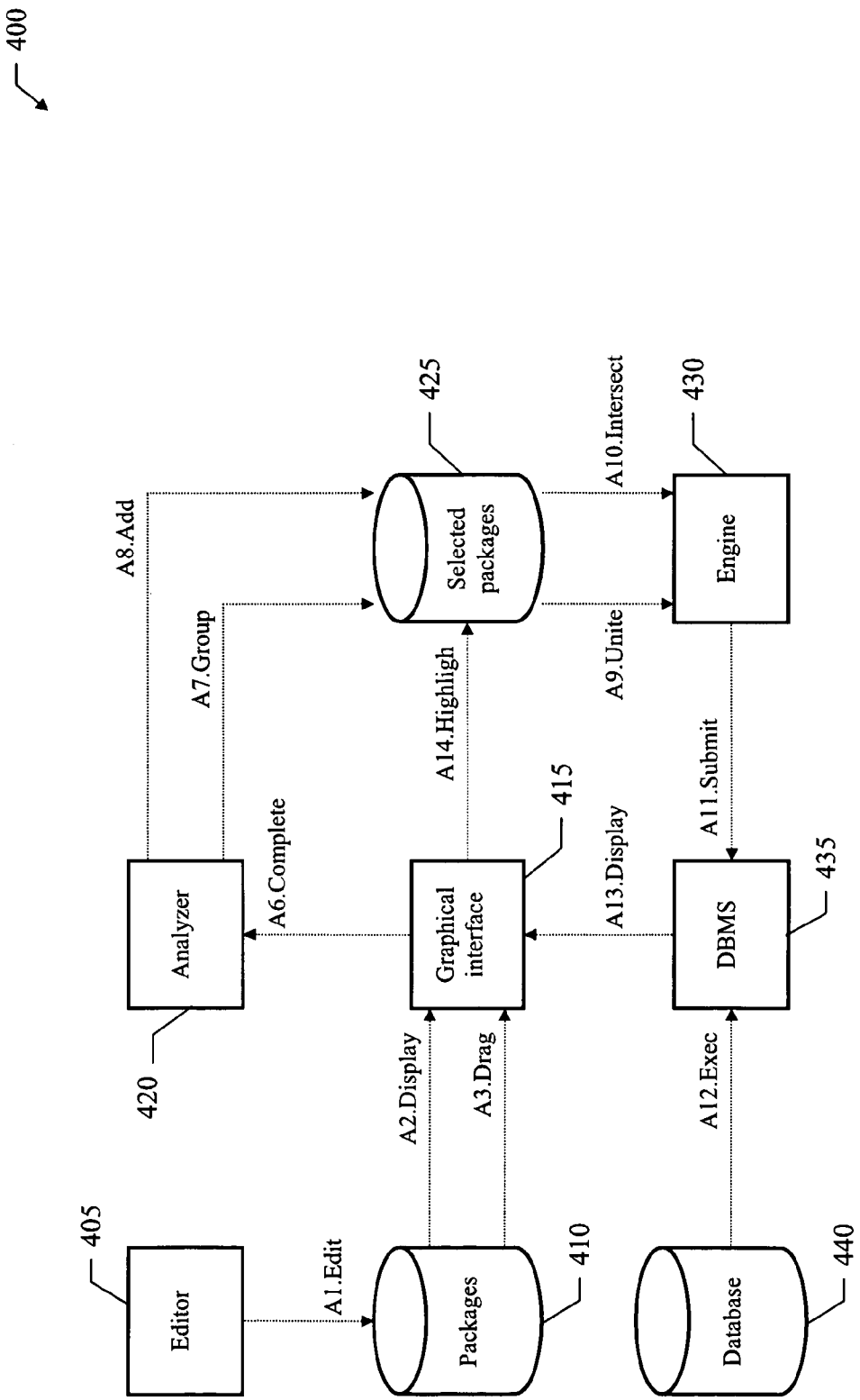
FIGS. 4A-4B are collaboration diagrams representing the roles of different software components used to implement embodiments of the invention.

Considering now FIG. 4A, the main software components that may be used to implement the solution according to an embodiment of the invention are denoted as a whole with reference 400. The information (programs and data) may be stored on the hard-disk and loaded, at least partially, into the working memory of the computer when the programs are running, together with an operating system and other application programs (not shown in the figure). The programs may be initially installed onto the hard disk, for example, from DVD-ROM. Particularly, the Figure describes the static structure of the system (by means of the corresponding components), and its dynamic behavior (by means of a series of exchanged messages, each one representing a corresponding action, denoted with sequence numbers preceded by the symbol "A").

An editor 405 may be used to create, update, delete, classify, and perform any other edit operation on the basic packages and related bricks. In this case, execution instructions of at least some of the basic packages may include searching criteria for the creation of database queries. Definitions for the basic packages and bricks may be stored in a corresponding repository 410 (action "A1.Edit").

A graphical interface 415 may access this repository 410 to display the bricks in the palette organized in the corresponding categories (action "A2.Display"). The user may drag any new brick to be selected towards the tower (action "A3.Drag").

In response, an analyzer 420 may extract any parameters from the execution instructions of the new brick, and assign them the corresponding values entered by the user at run-time (action "A6.Complete"). If the new brick is dropped at the same position of one or more selected bricks in the tower, an indication of its basic package may be inserted into the corresponding entry of the table 425 (action "A7.Group"). Conversely, if the new brick is dropped at a new position (on top of the tower or between two selected bricks), a new entry may be added to the table 425 in the correct position, and an indication of the corresponding basic package may be inserted into the new entry (action "A8.Add").

An engine 430 may access the table 425. Whenever a new basic package is inserted into a preexisting entry of the table 425 (above-mentioned action "A7.Group"), the execution instructions of the new basic package may be combined with the execution instructions of the other selected basic packages in the same entry in logic OR (action "A9.Unite"). The execution instructions so obtained may then be combined with the execution instructions of the preceding entries in the table 425 (preferably saved in a cache structure at a previous iteration of the process) in logic AND. The same operations may be repeated up to the last entry of the table 425 by saving the partial results in the cache structure at each iteration of the process (action "A10.Intersect).

Conversely, when a new basic package is inserted into a new entry of the table 425 (above-mentioned action "A8.Add"), the execution instructions of the new entry may be directly combined with the execution instructions of the preceding entries in the table 425 in logic AND. The same operations may be repeated up to the last entry of the table 425, provided the new entry is not the last one (same action "A10.Intersect).

In any case, the engine 430 may submit the query to a DBMS 435 (action "A11.Submit"). In response, the DBMS 435 may execute the query on a controlled database 440 (action "A12.Exec"). The DBMS 435 may return the result of the query to the graphical interface 415 for display in a corresponding report. In certain embodiments, the user may select from varying formats of the report, for example, as a pie-chart, a table, or any other known paradigm (action "A13.Display").

The user may also exploit the graphical interface 415 to highlight another selected brick in the tower (action "A14.Highlight"). In response, a new query may be generated by combining the execution instructions of the entry for the highlighted selected brick with execution instructions of the preceding entries in the table 425 (same action "A10.Intersect). As above, the new query may be submitted to the DBMS 435 for execution, with the corresponding result displayed through the graphical interface 415 (same actions "A11-A13").

Figure 4B:
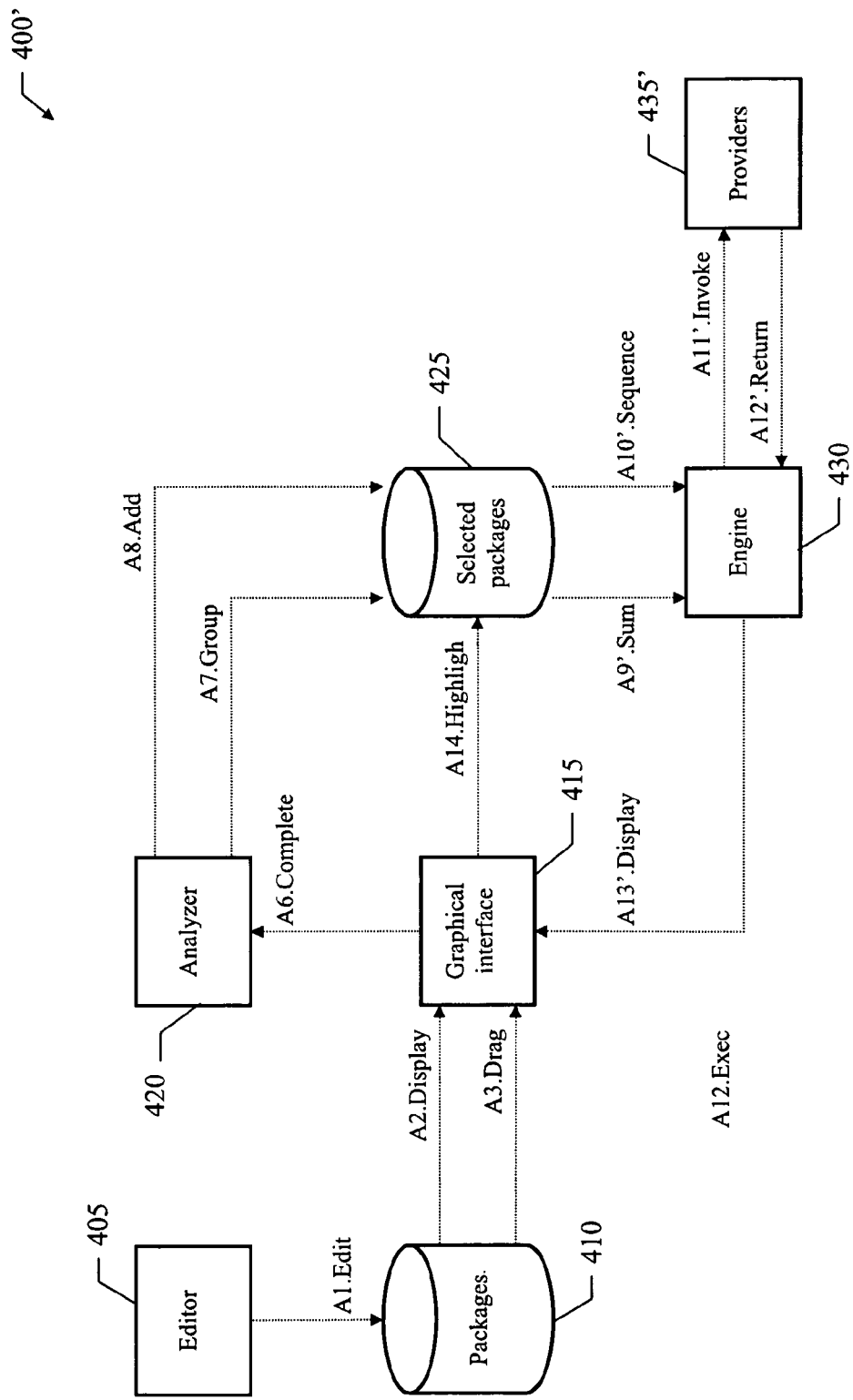

Moving to FIG. 4B, the main software components that can be used to implement the method according to another embodiment of the invention are denoted as a whole with reference 400'. In the following, elements similar to the ones shown in FIG. 4A are indicated with the same references, and their explanation is omitted for the sake of simplicity.

Particularly, the bricks may be selected exactly as described above (same actions "A1-A8"). In this case, however, execution instructions of at least some of the basic packages may include an indication of simple operations to be executed. The engine 430 may schedule execution of the simple operations of the selected basic packages as indicated in the table 425. Particularly, the simple operations of the selected basic packages in each common entry of the table 425 may be controlled so as to invoke them together, and thus sum all the results (action "A9'.Sum"). Conversely, the simple operations of the selected basic packages in different entries of the table 425 may be controlled so as to sequence their invocation in a logic pipeline. In this manner, the simple operations of each entry may consume a result of the simple operations of a preceding entry (action "A10'.Sequence").

The engine 430 may invoke the simple operations in the correct succession (or even concurrently when possible) by submitting corresponding commands to one or more providers 435', such as a discovery tool, a license management application, and the like (action "A11'.Submit"). In response, the providers 435' may return a result of the execution of the simple operations to the engine 430 (action "A12'.Return"). Finally, the engine 430 may return the overall result of the execution of the whole complex operation (defined by the simple operations of the selected basic packages) to the graphical interface 415 for display (action "A13'.Display").

As above, some embodiments may highlight another selected brick in the tower to cause the execution of a corresponding (partial) complex operation (same action "A14.Highlight"). This feature may be advantageously exploited, for example, to verify on which entities (defined by a query created by combining the filtering criteria of the selected bricks up to the highlighted brick) a desired action (defined by the simple operations of the selected bricks above the highlighted brick) will be executed.

Naturally, in order to satisfy local and specific requirements, a person skilled in the art may apply to the solution described above many logical and/or physical modifications and alterations. More specifically, although the present invention has been described with a certain degree of particularity with reference to certain embodiments thereof, it should be understood that various omissions, substitutions and changes in the form and details as well as other embodiments are possible. Particularly, the proposed solution may even be practiced without the specific details (such as the numerical examples) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any disclosed embodiment of the invention may be incorporated in any other embodiment as a matter of general design choice.

Particularly, the proposed solution lends itself to be implemented with an equivalent method (by using similar steps, removing some steps being non-essential, or adding further optional steps). Moreover, the steps may be performed in a different order, concurrently or in an interleaved way (at least in part).

It should be readily apparent that the above-described examples of basic packages (with the corresponding execution instructions and combination instructions) are merely illustrative, and they must not be interpreted in a limitative manner. More generally, the execution instructions may consist of any other specification that partially contributes to executing a complex operation (i.e., adapted to be split into multiple independent segments). For example, the execution instructions may indicate entire queries, a chain of multiple simple operations, parameters for running software modules, invocations of networks services, and the like. Likewise, the combination instructions may consist of any specification of how to combine the execution instructions of the basic packages (such as commands in a specific glue language). Particularly, the combination may involve the creation of one or more statements to be executed as a whole (such as in the case of queries). In addition or in alternative, the combination may involve the submission of different statements in a specific order. It should also be noted that the graphic interface may either directly execute the resulting complex operation, or may simply invoke its execution on remote computers.

Similar considerations may apply if the basic packages are represented graphically in a different way (for example, with icons or equivalent objects). Moreover, the bricks may be organized in any other manner (for example, in a tree structure), even if their simple listing is not excluded in a very simplified implementation. Likewise, the bricks may be selected by double-clicking over them, or with any other equivalent technique. In any case, any specification (even in textual form) of the basic packages for their selection is within the scope of the proposed solution.

The possibility of highlighting any selected brick to cause the execution of a new complex operation for the selected bricks up to the highlighted brick is not strictly necessary, and may be omitted in specific implementations. Moreover, the selected bricks may be arranged in any other sequence (for example, along a horizontal direction), or more generally even without any order relation. In one embodiment, for example, the bricks may be simply inserted into a generic selection area.

The parameters of the execution instructions may be assigned at run-time in a different way. For example, their values may be retrieved automatically from environmental variables, such as stored in a configuration file. However, nothing prevents only supporting static basic packages (without any parameters to be assigned dynamically) in a simplified implementation.

As pointed out above, the proposed solution is not tied to any specific DBMS (with its query language), or more generally to any information retrieval system.

Likewise, the possibility of grouping more bricks in the same position (to combine the corresponding searching criteria in logic OR) may be implemented with a different graphical metaphor (for example, by tiling the corresponding bricks). In addition or in the alternative, it may be possible to implement different logic operators for combining the searching criteria of the selected bricks (such as NOT, XOR, NAND, and the like). More generally, the execution instructions may be combined with operators of aggregation, correlation, transformation, or any combination thereof.

In addition, the same solution may also be applied in the realm of capacity planning, Human Resource (HR) management, and so on.

More generally, it may be possible to combine any type of execution instructions into any complex operation. For example, nothing prevents combining basic blocks that retrieve information (such as by executing a query) with basic blocks that manipulate this information or that launch other operations driven by this information. A possible application may include selection of basic blocks that identify specific computers, followed by selection of a basic block that installs a particular software product on these computers. However, the mere invocation of independent simple operations (without passing any result along them) may not be excluded.

Embodiments of the invention may be implemented as stand-alone tools, as plug-ins for a management application (such as a DBMS, a license management application, a software distribution application, and the like), or even directly in the management application itself. It would be readily apparent that it is also possible to deploy the same solution as a service that is accessed through a network, such as in the Internet. Similar considerations may apply if the program (which may be used to implement embodiments of the invention) may be structured in a different way, or if additional modules or functions may be provided. Likewise, the memory structures may be of other types, or may be replaced with equivalent entities, not necessarily consisting of physical storage media. In any case, the program may take any form suitable to be used by any data processing system or in connection therewith, for example, within a virtual machine.

Particularly, the program may be in the form of external or resident software, firmware, or microcode (either in object code or in source code, for example, to be compiled or interpreted). Moreover, it may be possible to provide the program on any computer-usable medium. The medium may include any article suitable to contain, store, communicate, propagate, or transfer the program. For example, the medium may be of the electronic, magnetic, optical, electromagnetic, infrared, or semiconductor type. Examples of such medium are fixed disks (where the program can be pre-loaded), removable disks, tapes, cards, wires, fibers, wireless connections, networks, broadcast waves, and the like. In any case, embodiments of the present invention may be implemented with a hardware structure (for example, integrated in a chip of semiconductor material), or with a combination of software and hardware.

Embodiments of a method in accordance with the invention may also be carried out on either a stand-alone computer or a system with distributed architecture, such as based on a client/server infrastructure. Moreover, the computer may have another structure or may include similar elements (such as cache memories temporarily storing the programs or parts thereof). In any case, it may be possible to replace the computer with any code execution entity (such as a PDA, a mobile phone, and the like), or with a combination thereof (such as a multi-tier architecture, a grid computing infrastructure, and the like).

The invention claimed is:

1. A method for executing complex operations in a data processing system, the method comprising:
providing basic packages, each basic package comprising execution instructions for at least partially executing a complex operation, and combination instructions for combining the execution instructions with execution instructions of another basic package;
presenting the basic packages as graphical objects on a screen of a user;
enabling the user to drag the graphical objects to a selection area on the screen to select the graphical objects;
enabling the user to specify a sequence for the graphical objects in the selection area;
enabling the user to select a graphical object other than the last graphical object in the sequence; and
executing a complex operation according to the execution instructions and the combination instructions associated with the graphical objects up to and including the selected graphical object in the sequence.

2. The method of claim 1, further comprising providing an input box for at least one of the graphical objects, the input box enabling a user to enter at least one parameter value for the basic package associated with the graphical object.

3. The method of claim 2, further comprising:
enabling the user to select the last graphical object in the sequence; and
executing a complex operation according to the execution instructions and the combination instructions associated with the graphical objects up to and including the last graphical object in the sequence.

4. The method of claim 1, wherein the execution instructions associated with graphical objects in the selection area include searching criteria for defining an information retrieval statement.

5. The method of claim 4, wherein executing the complex operation further comprises:
creating a retrieval statement by combining the searching criteria; and
submitting the retrieval statement for execution.

6. The method of claim 5, wherein dragging the graphical objects further comprises arranging at least two graphical objects at a common position along the sequence.

7. The method of claim 1, wherein the execution instructions associated with at least one of the graphical objects in the selection area comprise simple operations integral to the complex operation.

8. The method of claim 7, wherein executing the complex operation comprises invoking the simple operations in an order corresponding to the order the graphical objects were dragged to the selection area.

9. A computer program product for executing complex operations in a data processing system, the computer program product comprising a non-transitory computer-readable storage medium having computer-usable program code embodied therein, the computer-usable program code comprising:
computer-usable program code for providing basic packages, each basic package comprising at least one of execution instructions for at least partially executing a complex operation, and combination instructions for combining the execution instructions with execution instructions of another basic package;
computer-usable program code for presenting the basic packages as graphical objects on a screen of a user;
computer-usable program code for enabling the user to drag the graphical objects to a selection area on the screen to select the graphical objects;
computer-usable program code for enabling the user to specify a sequence for the graphical objects in the selection area;
computer-usable program code for enabling the user to select a graphical object other than the last graphical object in the sequence; and
computer-usable program code for executing a complex operation according to the execution instructions and the combination instructions associated with the graphical objects up to and including the selected graphical object in the sequence.

10. The computer program product of claim 9, further comprising computer-usable program code for providing an input box for at least one of the graphical objects, the input box enabling a user to enter at least one parameter value for the basic package associated with the graphical object.

11. A system for executing complex operations in a data processing system, the system comprising:
- at least one processor;
- at least one memory device coupled to the at least one processor and storing computer instructions for execution on the at least one processor, the computer instructions causing the at least one processor to:
  - provide basic packages, each basic package comprising execution instructions for at least partially executing a complex operation, and combination instructions for combining the execution instructions with execution instructions of another basic package;
  - present the basic packages as graphical objects on a screen of a user;
  - enable the user to drag the graphical objects to a selection area on the screen to select the graphical objects;
  - enable the user to specify a sequence for the graphical objects in the selection area;
  - enable the user to select a graphical object other than the last graphical object in the sequence; and
  - execute a complex operation according to the execution instructions and the combination instructions associated with the graphical objects up to and including the selected graphical object in the sequence.

12. The system of claim 11, wherein the computer instructions further cause the at least one processor to provide an input box for at least one of the graphical objects, the input box enabling a user to enter at least one parameter value for the basic package associated with the graphical object.

13. The system of claim 12, wherein the computer instructions further cause the at least one processor to:
- enable the user to select the last graphical object in the sequence; and
- execute a complex operation according to the execution instructions and the combination instructions associated with the graphical objects up to and including the last graphical object in the sequence.

* * * * *